United States Patent
Raamot et al.

(10) Patent No.: US 6,353,858 B1
(45) Date of Patent: Mar. 5, 2002

(54) MULTIPLE-LOCAL AREA NETWORKS INTERCONNECTED BY A SWITCH

(75) Inventors: Jaan Raamot, Broomfield; Silverio C. Vasquez, Westminster, both of CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/203,016

(22) Filed: Nov. 30, 1998

(51) Int. Cl.[7] .............................................. G06F 13/00
(52) U.S. Cl. ..................... 709/249; 709/218; 709/311; 370/351; 370/389
(58) Field of Search ................................ 709/200, 218, 709/249, 310, 311; 370/388, 395, 397, 401, 351, 389, 400; 340/825.79; 713/150, 151

(56) References Cited

U.S. PATENT DOCUMENTS

| | | | | |
|---|---|---|---|---|
| 5,144,622 A | * | 9/1992 | Takiyasu et al. | 370/401 |
| 5,452,297 A | * | 9/1995 | Hiller et al. | 370/395 |
| 5,621,893 A | * | 4/1997 | Joh | 709/249 |
| 5,768,270 A | * | 6/1998 | Ha-Duong | 370/388 |
| 5,784,003 A | * | 7/1998 | Dahlgren | 340/825.79 |
| 5,818,842 A | * | 10/1998 | Burwell et al. | 370/397 |
| 6,259,699 B1 | * | 7/2001 | Opalka et al. | 370/398 |

FOREIGN PATENT DOCUMENTS

WO    WO-0007337    * 2/2000    ........... H04L/12/64

* cited by examiner

Primary Examiner—Zarni Maung
Assistant Examiner—Wen-Tai Lin
(74) Attorney, Agent, or Firm—Matthew J. Hodulik

(57) ABSTRACT

Local area networks are dynamically connected to one another by a switching system only when there is a packet to be exchanged between the two local area networks, otherwise the local area networks operate as separate and independent local area networks. The switching system can concurrently interconnect multi-pairs of local area networks together. The overall capacity of the local area networks interconnected via the switching system is increased since the local area networks operate free of other local area networks except when directly exchanging packets with another local area network. The switching system comprises a space switching unit and switch interface units with each switch interface unit interconnecting an individual local area network to the space switching unit. When a first switch interface unit receives a packet from a connected local area network destined for another local area network, the first switch interface unit establishes a first unilateral path to the other local area network and determines if the other local area network is idle. If the other local area network is idle, the first switch interface unit establishes a second unilateral path from the connected local area network to the other local area network via the space switching unit so that the packet from the connected local area network can be transmitted to the other local area network.

14 Claims, 8 Drawing Sheets

MULTIPLE-LOCAL AREA NETWORKS INTERCONNECTED BY A SWITCH

TECHNICAL FIELD

This invention relates generally to switching systems and, in particular, to the switching of data.

BACKGROUND OF THE INVENTION

Local area networks (LAN) function by a network port transmitting a packet onto the LAN and determining if a collision occurred. As transmission rates increase the packet lengths decreases time wise. In addition, the geographical area that the LAN can cover also decreases since the interval for detecting collisions decreases as packet length shrinks in time. The network is limited to the distance at which all ports can still detect a collision during the packet transient time, and is limited in data throughput to less than the link rate. However, all of the LANs interconnected have the same restrictions with respect to transmission rates and geographical area.

Bridges or gateways between LANs eliminate the need for all ports within the combined LANs to detect a collision during a packet transient time. However, bridges and/or gateways require that the packet be stored internally to the bridge or gateway before it is transferred from one LAN to another LAN. In addition, the complexity of the protocol utilized by the network ports is increased since the network port has no simple mechanism for determining whether the packet reached the destination port. On a single LAN, this simple detection of whether the packet reached the destination is based on whether a collision occurred or not.

SUMMARY OF THE INVENTION

The foregoing problems are solved, and a technical advance is achieved by an apparatus and method in which local area networks are dynamically connected to one another by a switching system only when there is a packet to be exchanged between the two local area networks, otherwise the local area networks operate as separate and independent local area networks. Advantageously, the switching system can concurrently interconnect multi-pairs of local area networks together. Advantageously, the overall capacity of the local area networks interconnected via the switching system is increased since the local area networks operate free of other local area networks except when directly exchanging packets with another local area network.

Advantageously, the switching system comprises a space switching unit and switch interface units with each switch interface unit interconnecting an individual local area network to the space switching unit. When a first switch interface unit receives a packet from a connected local area network destined for another local area network, the first switch interface unit establishes a first unilateral path from the other local area network via a second switch interface unit connected to the other local area network and the space switching unit to the first switch interface unit. The first switch interface unit determines if the other local area network is idle via the first unilateral path. If the other local area network is idle, the first switch interface unit establishes a second unilateral path from the connected local area network to the other local area network via the space switching unit and the first and second switch interface units so that the packet from the connected local area network can be transmitted to the other local area network. The first switch interface unit remove both unilateral paths after transmission of the packet. If the first switch interface unit determines that the other local area network is busy via first unilateral path, the first switch interface unit generates a collision message to the connected local area network.

DETAILED DESCRIPTION

Figure 1:
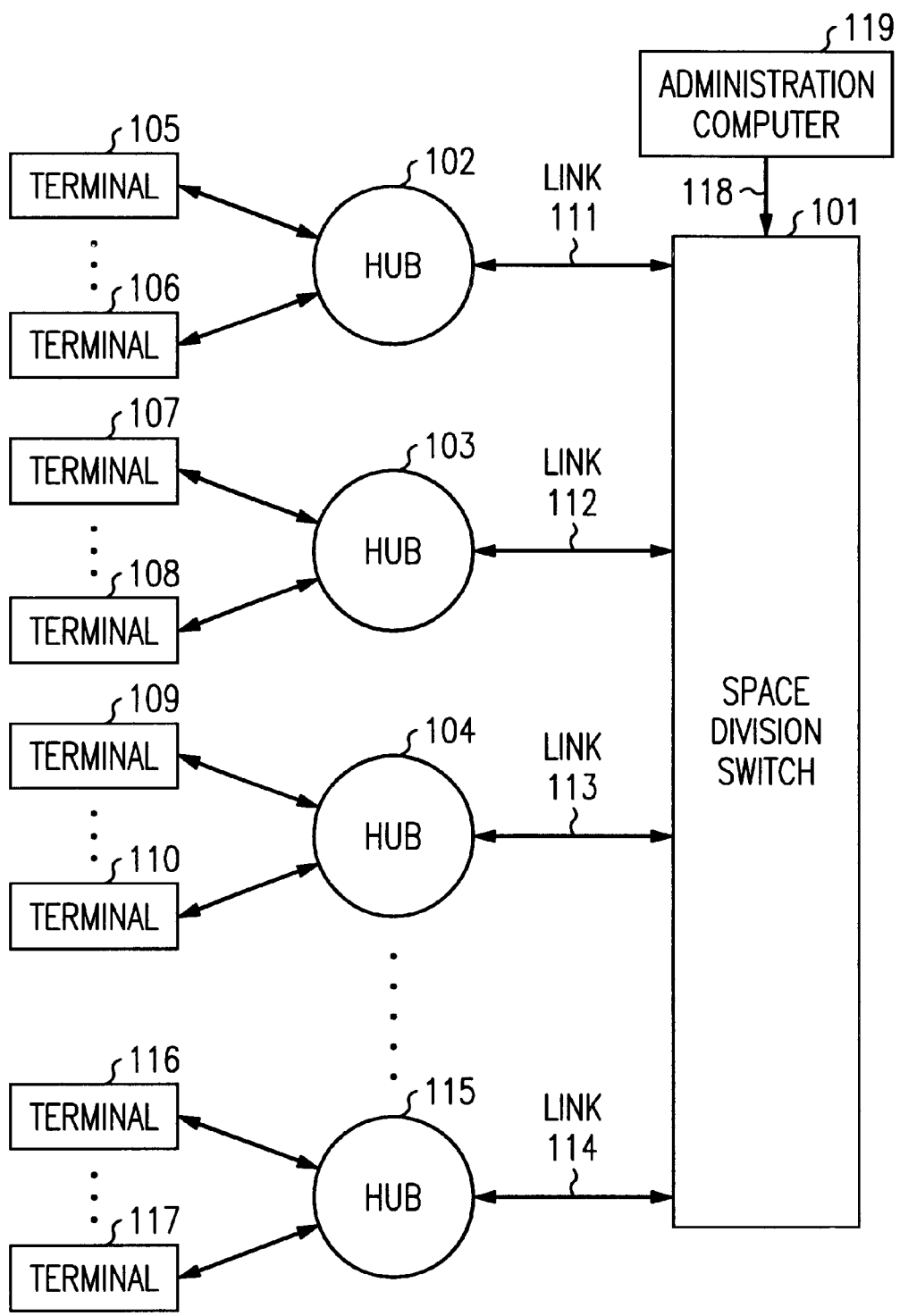
FIG. 1 illustrates, in block diagram form, a system in accordance with the invention.
Figure 3:
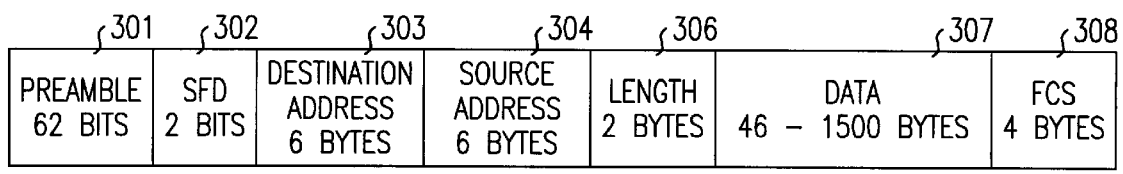
FIGS. 3–4 illustrate packets that are transmitted by terminals.
Figure 4:
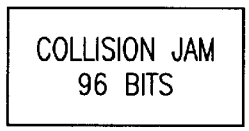

FIG. 1 illustrates, in block diagram form, a system in accordance with the invention. Hubs 102–104 and 115 are each capable of functioning as a stand alone unit. For example, if terminal 105 wishes to transmit a packet to terminal 106, this communication is done solely within Hub 102. Space division switch 101 is connected to each Hub as a terminal. Links 111–114 each comprise a transmit and receive sublink as illustrated in greater detail in FIG. 2. Administration computer 119 provides address information to the Hubs so that a Hub can determine if it is necessary to route a packet to another Hub via space division switch 101. Returning to the previous example, terminal 105 transmits a packet as illustrated in FIG. 3. If a collision occurs, a jam signal as illustrated in FIG. 4 is transmitted to guarantee that all terminals in Hub 102 recognize that a collision has occurred. For example, if terminal 105 was attempting to transmit a packet to terminal 106 and another terminal was transmitting at the same time on Hub 102, terminal 105 detects a violation of the protocol of a packet as illustrated in FIG. 3 and transmits the jam signal as illustrated in FIG. 4. Terminal 105 generates the jam signal and attempts to transmit the packet at a later point in time to terminal 106. During the transmission of a packet from terminal 105 to terminal 106, no connection is made from Hub 102 to any other Hub through space division switch 101.

If terminal 105 wishes to transmit a packet to terminal 109 connected to Hub 104, terminal 105 transmits the packet to Hub 102. Space division switch 101 is monitoring link 111 for destination addresses in packets which do not correspond to a terminal connected to Hub 102. When space division switch 101 recognizes the destination address as designating terminal 109, space division switch 101 monitors for activity on Hub 104. If a packet is presently being transmitted on Hub 104, space division switch does not allow the transmission of the packet from terminal 105 to terminal 109. Further, space division switch 101 upon recognizing the destination address as being that of terminal 109 establishes a unilateral path from Hub 104 to Hub 102 via link 113 and link 111. Since another terminal is transmitting a packet on Hub 104 this packet is also being transmitted on Hub 102 via the unilateral path, and terminal 105 detects a collision. Note, that the transmission of the packet on Hub 104 is not interfered with since no transmission path was setup from Hub 102 to Hub 104.

To further the previous example, assume that terminals 105 and 107 simultaneously attempt to transmit a packet to terminal 109. Space division switch 101 establishes a unilateral path from Hub 104 to Hub 102 and a second unilateral path from Hub 104 to Hub 103. If terminal 110 is transmitting a packet on Hub 104, space division switch 101 does not allow Hubs 102 and 103 to transmit the packets from their respective transmitting terminals to Hub 104. Terminals 105 and 107 will both detect collisions and attempt to transmit at a later point in time. Assume that terminal 110 was not transmitting a packet, and Hub 104 was idle when terminals 105 and 107 both simultaneously started to transmit a packet to terminal 109. Both packets are allowed to be transmitted via space division switch to Hub 104 to terminal 109, however, terminals 105 and 107 detect a collision and generate the jam signal as illustrated in FIG. 4. Space switch 101 is non-blocking. This allows two terminals, each connected to a different Hub, to be simultaneously transmitting via space division switch 101 to two destination terminals each connected to other Hubs. For example, terminal 105 can be transmitting to terminal 110 simultaneous with the transmission of terminal 108 to terminal 116. In addition, a terminal can transmit to all other terminals utilizing the broadcast capabilities of space division switch 101.

Figure 2:
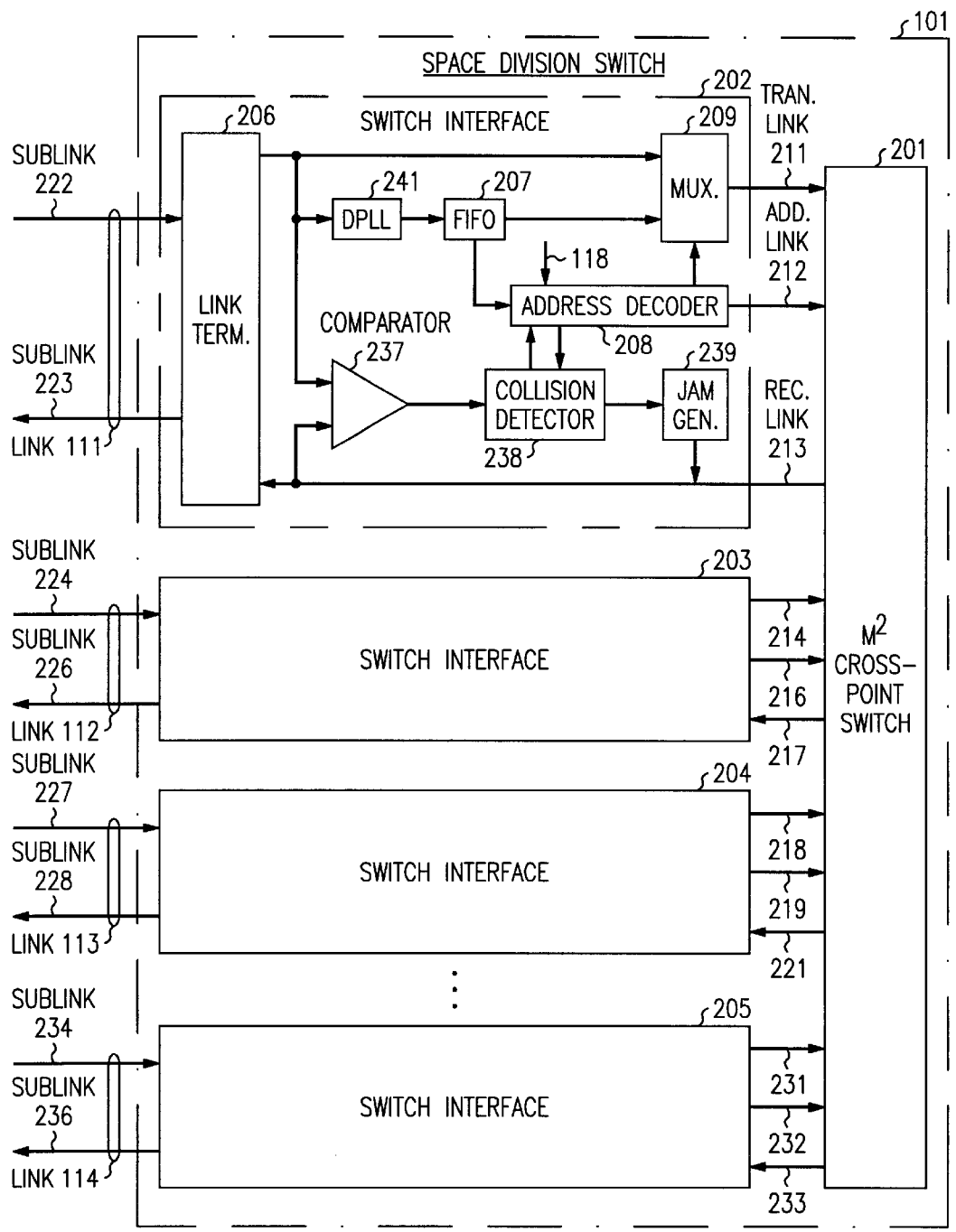
FIG. 2 illustrates, in block diagram form, details of the space division switch.

FIG. 2 illustrates further details of space division switch 101. Cross-point switch 201 is a m-input and m-output switch. The input links to cross-point switch 201 are links 211, 214, 218, and 231. The output links from cross-point switch 201 are links 213, 217, 221, and 233. Links 212, 216, 219, and 232 supply address information to cross-point switch 201. To allow a broadcast capability, each address link comprises m-conductors. Each of the address conductors is capable of connecting the transmit link to all output links simultaneously. Links 111, 112, 113, and 114 of FIG. 1 each comprise 2 sublinks. One sublink is utilized to transmit data from a Hub to space division switch 101, and the other sublink is used to transmit data from space division switch 101 to a Hub.

Consider the previous example where terminal 105 is transmitting to terminal 109 but there is activity on Hub 104. All packets transmitted on Hub 102 are communicated to link terminator 206 via sublink 222. The information received by link terminator 206 is transmitted to multiplexor 209 and to digital phase lock loop (DPLL) 241. DPLL 241 recovers the clock and data from the information received from multiplexor 209 and transmits the clock and data to First-In-First-Out (FIFO) 207. In the idle state, multiplexor 209 is selecting the output being received directly from link terminator 206. FIFO 207 has a capacity of 15 bytes. It can be seen from FIG. 3, that this allows FIFO 207 to buffer fields 301–303 and the first byte of field 304 (source address field). Address decoder 208 under control of collision detector 238 monitors the destination address of every packet as it is buffered in FIFO 207 to determine if the packet is destined for another Hub other than Hub 102. Address decoder receives address information via cable 118 from administration computer 119. When address decoder 208 determines that the destination address field designates that the packet is going to terminal 109 via Hub 104, address decoder 208 signals collision detector 238. Address decoder 208 under control of collision detector 238 then transmits an address via link 212 to cross-point switch 201 to establish a unilateral path from Hub 104 via sublink 227, switch interface 204, link 218, and cross-point switch 201. Collision detector 238 monitors using comparator 237 via this unilateral path Hub 104 to determine if Hub 104 is idle. If Hub 104 is idle, Collision detector 238 enables multiplexor 209 so that the output of FIFO 207 is transmitted via link 211, cross-point switch 201, link 221, switch interface 204, sublink 228 to Hub 104. Upon detecting that there is no activity in Hub 104, collision detector 238 also establishes via address decoder 208 the unilateral path via cross-point switch 201 to allow the transmission of data from link 211 to link 221.

If Hub 104 is not idle when terminal 105 attempts to transmit a packet to it, collision detector 238 detects this and does not establish the path from link 211 to link 221 via cross-point switch 201. Collision detector 238 also activates jam generator 239 so that terminal 105 can detect a collision. Then, collision detector 238 drops the link 218 to link 213 connection.

During the transmission of a packet from terminal 105 to terminal 109, terminal 110 can commence transmitting a packet also. In this situation, terminals 105 and 110 detect a collision and transmit the jam signal as illustrated in FIG. 4 to Hub 104. Terminals 105 and 110 recognize the collision and will attempt transmission of the packets at a later point in time. Hub 103 is interfaced to cross-point switch 201 via sublinks 224 and 226, switch interface 203 which is identical in design to switch interface 202 and links 222 and 223.

Figure 5:
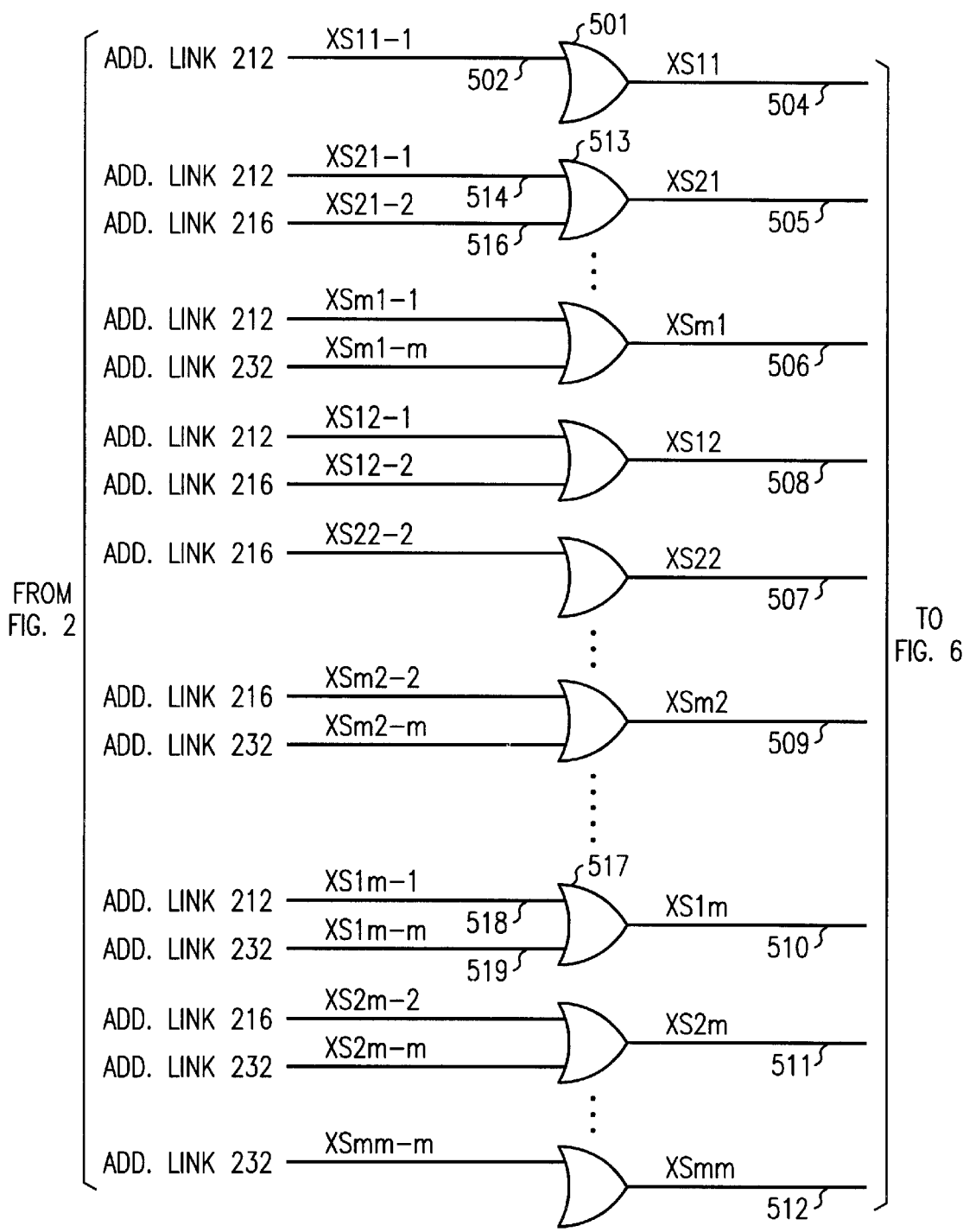
FIGS. 5–6 illustrate in greater detail a cross-point switch.
Figure 6:
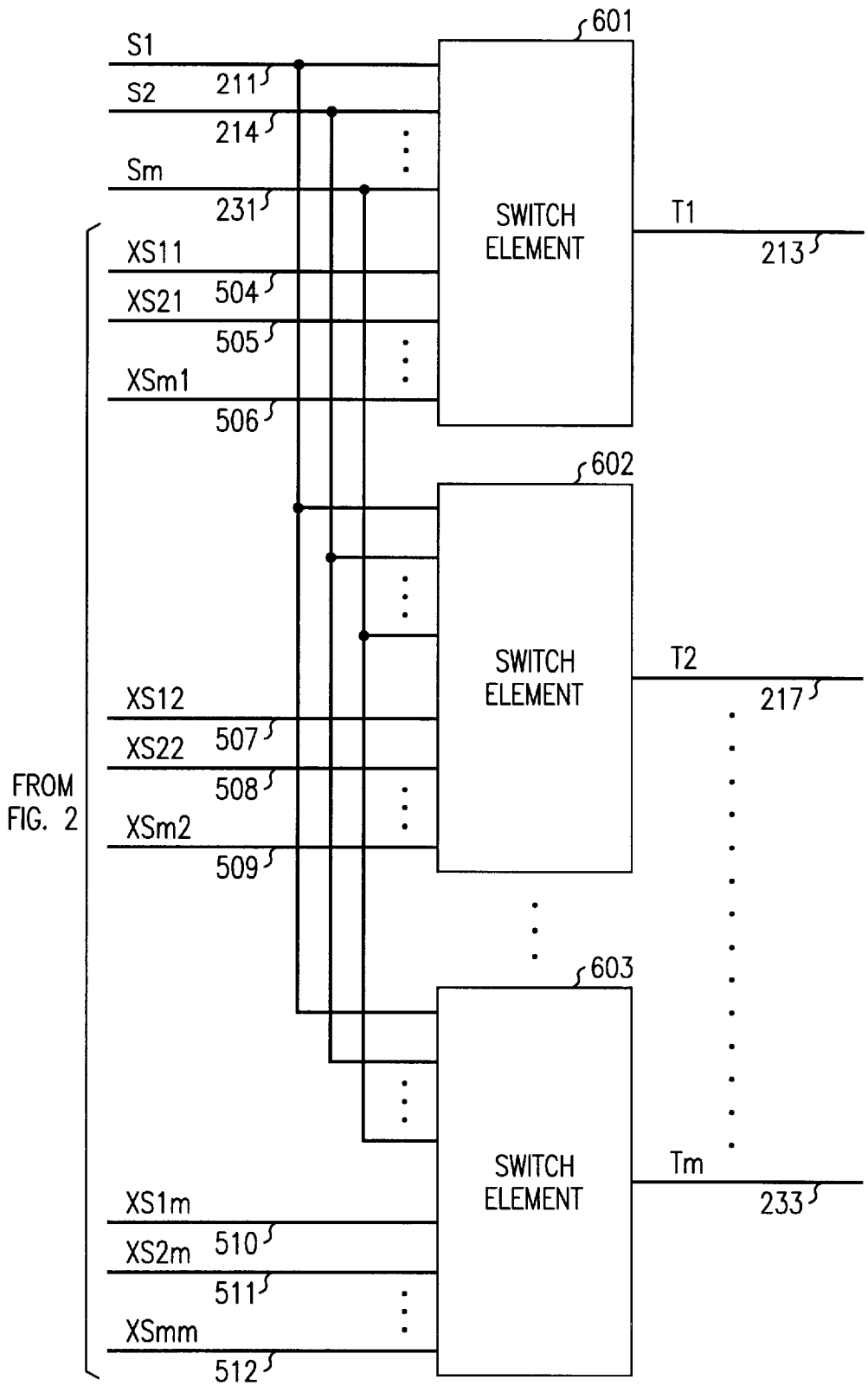

FIGS. 5 and 6 illustrate cross-point switch 201 in greater detail. Switch interface 202 of FIG. 2 must generate the necessary addresses on address link 212 to cross-point switch 201 such that the output of any other switch interface can be connected to receive link 213 and the data on transmit link 211 can be connected to the receive link of any other switch interface. The other switch interfaces have similar requirements. In FIGS. 5 and 6, switch interface 205 is designated as "m" with respect to its inputs and outputs. In FIG. 6, the output of switch interface 202 on transmit link 211 is designated as S1 and receive link 213 is designated as T1. The other switch interfaces are similarly treated. The use of these letter designations is done to allow a better understanding of the operations of FIGS. 5 and 6. As previously noted, switch interface 202 must be able to switch its transmit link 211, S1, to any receive link of another switch interface connected to cross-point switch 201. Note, the capability of switching S1 to T1 is done for diagnostic purposes only. To switch S2 which is transmit link 214 to T1, switch interface 202 must generate a XS21 signal. The manner in which this generation is done in FIG. 5 will be described shortly. In addition, switch interface 203 must also be capable of generating the XS12 signal so that switch interface 203 can transmit data to Hub 102 of FIG. 1. Switch element 602 through 603 must function in a similar manner to switch element 601. For example, the signals XS1m, 510, must be generated by both switch interface 202 and switch interface 205. The manner is which these "XS" address signals are generated is illustrated in FIG. 5.

As can be seen from FIG. 5, address link 212 from switch interface 202 contains a XS21-1 signal that is transmitted on conductor 514. A true signal on conductor 514 causes a true signal to be generated by OR gate 513 on line 505 which is designated XS21. This signal causes switch element 601 to transfer S2 to T1 on FIG. 6. Similarly, switch interface 203 must also cause the XS21 signal to be generated, this is done by switch interface 203 transmitting a XS21-2 signal on address link 216. The nomenclature used for the inputs to the OR gates illustrated in FIG. 5 is that the dash number indicates the switch interface that the signal is coming from. For example, XS11-1 is generated from switch interface 202 and XSm1-m is generated by switch interface 205. The XS1m signal that is transmitted on conductor 510 must be generated by either switch interface 202 or switch interface 205. A true signal on either conductor 518 or 519 will cause OR gate 517 to transmit a true signal on conductor 510, XS1m.

Figure 7:
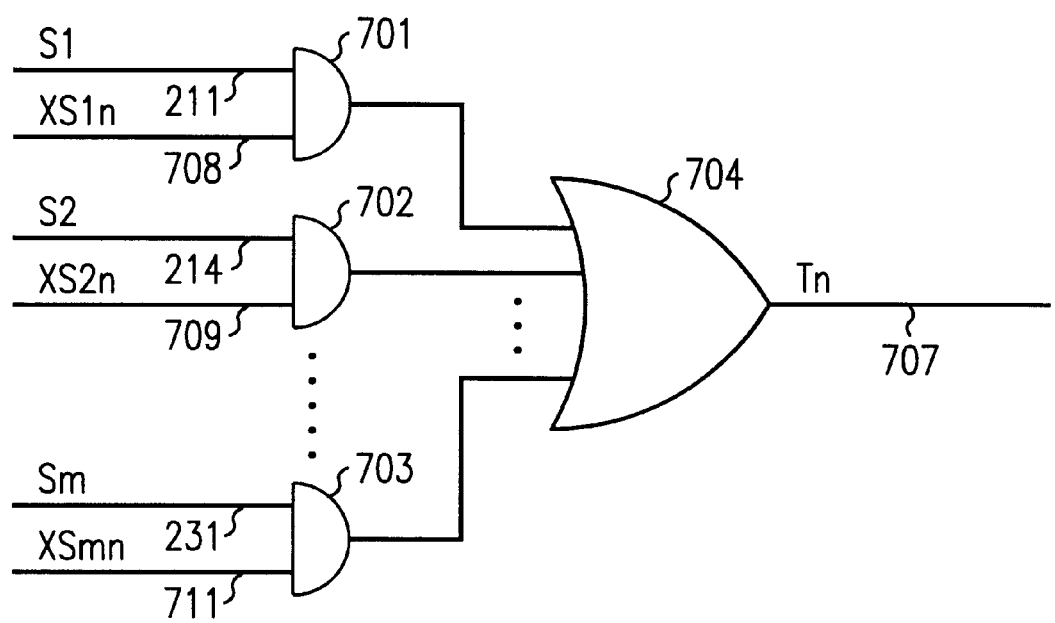
FIG. 7 illustrates a switch element in greater detail.

FIG. 7 illustrates in greater detail a switch element such as switch element 601 of FIG. 6. If FIG. 7 illustrates switch element 601, then the numbers denoted by "n" would be "1" and lines 708, 709, and 711 would be connected to lines 504, 505, and 506. Consequently, if the switch element of FIG. 7 denoted switch element 602, then, "n" would be a "2" and lines 708, 709, and 711 would be connected to lines 507, 508, and 509 respectively. Each XS designates that a particular S input is to be switched to a particular T output. For example, XS11 being true causes S1 to be switched to T1. Whereas, XS12 being true causes S1 to be switched to T2.

Figure 8:
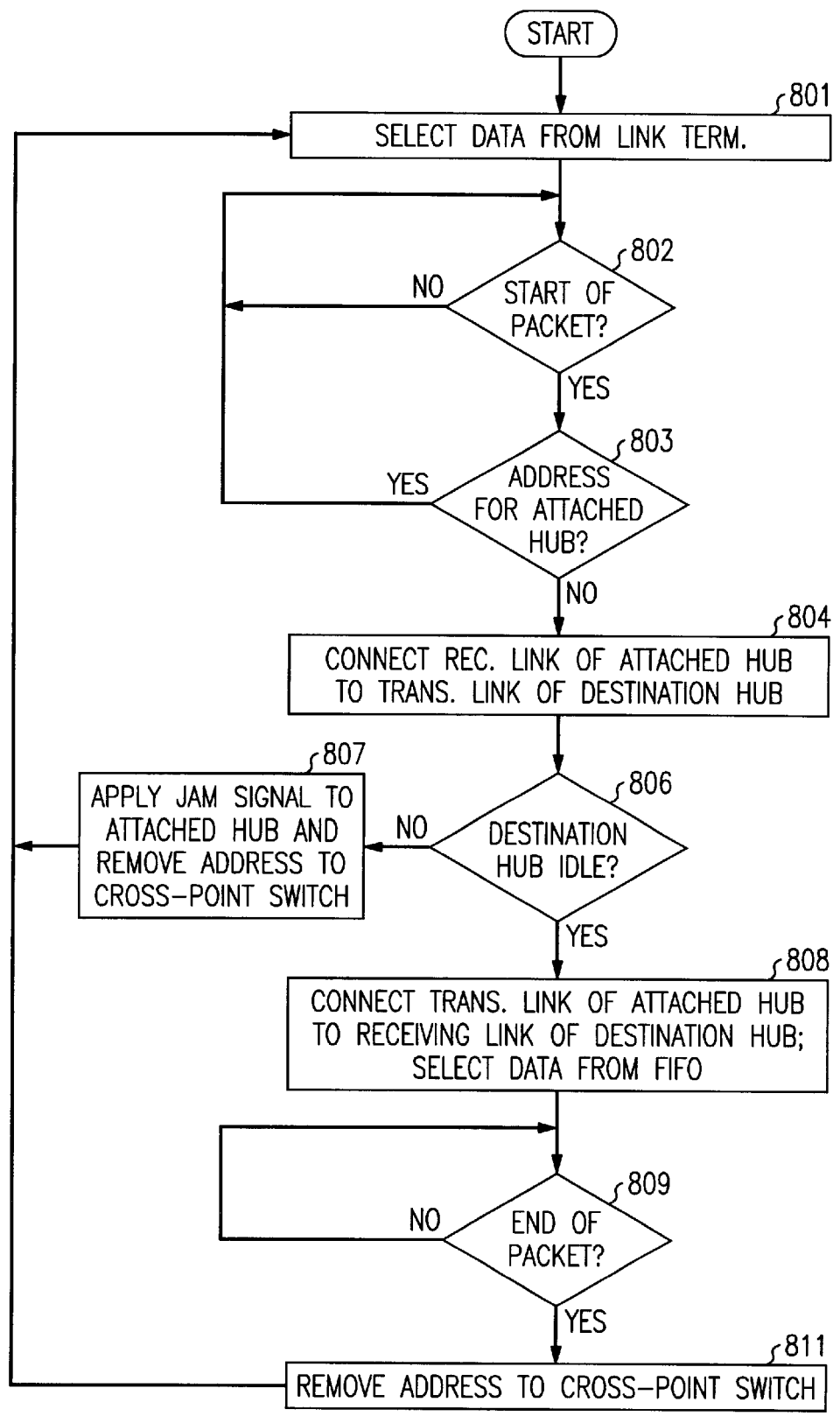
FIG. 8 illustrates, in flow chart form, steps performed by a collision detector of a space division switch.

FIG. 8 illustrates, in flow chart form, steps performed by collision detector 238. The following is with respect to switch interface 202, but the other switch interfaces of FIG. 2 operate in a similar manner. After being started, block 801 controls multiplexor 209 so that the data being transmitted on transmit link 211 is selected from link terminator 206. Decision block 802 waits for the start of packet transmission on sublink 222 to occur. When the start of the packet is detected, control is transferred to decision block 803 which accesses address decoder 208 when the address has been fully received to determine if it is the address for the attached Hub. If the answer is yes, control is transferred back to decision block 802. If the answer in decision block 803 is no, control is transferred to block 804. The latter block enables address decoder 208 to transmit the address of the destination Hub via address link 212 to cross-point switch 201. Cross-point switch 201 is responsive to the address on address link 212 to setup a connection from the transmit link of the destination Hub to receive link 213 of switch interface 202. Note, that it is the transmission link of the destination switch interface that is actually connected via cross-point switch 201. Decision block 806 then determines if the destination Hub is idle. If the answer is no, 807 applies the jam signal to the attached Hub by controlling jam generator 239 and removes the address being transmitted to cross-point switch 201 via address link 212 by controlling address decoder 208.

If the answer in decision block 806 is yes, collision detector 238 controls multiplexor 209 to select the output of FIFO 207 for transmission on transmit link 211 and controls address decoder 208 to transmit the address to cross-point switch 201 that will connect transmit link 211 to the received link of the destination switch interface. The destination switch interface then transfers the received data to the destination Hub. After execution of block 808, decision block 809 waits until the packet has been completely transmitted and then removes the address information being transmitted on address link 212 to cross-point switch 201. Cross-point switch 201 is responsive to the removal of the address information to remove all connections between switch interface 202 and the destination switch interface. After execution of block 811, control is transferred back to block 801.

Figure 9:
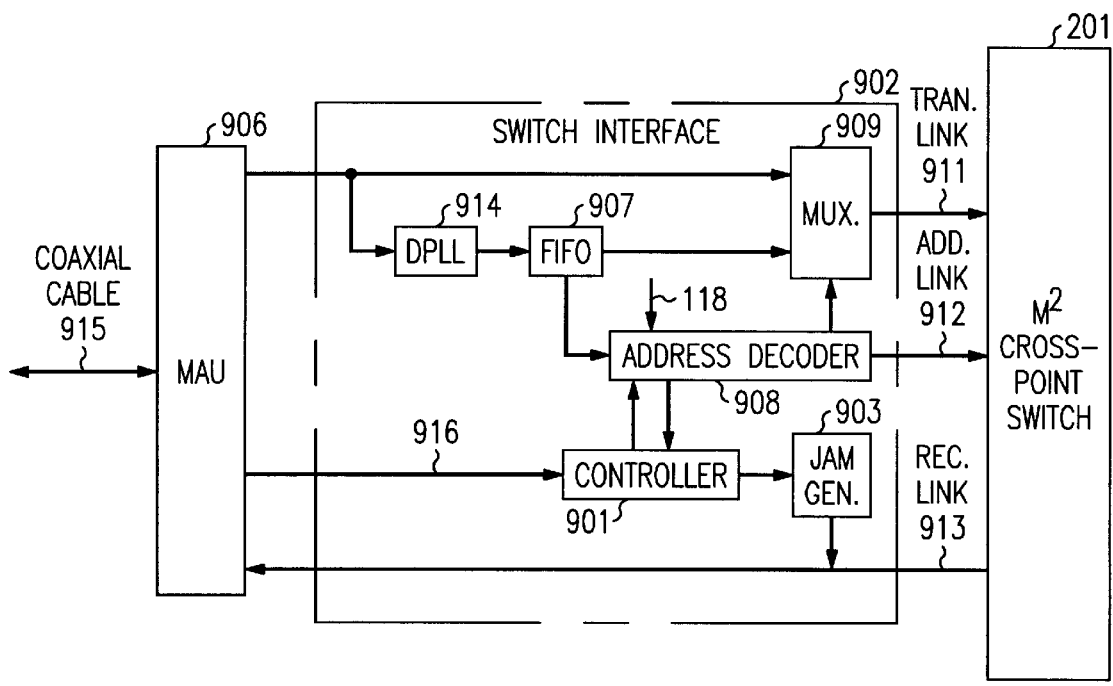
FIG. 9 illustrates, in block diagram form, a coaxial interface for a space division switch.

FIG. 9 illustrates switch interface 902 which is designed to function with a coaxial cable Ethernet. Medium Attachment Unit (MAU) 906 is a standard commercial part. Elements 903, 907, 908, 909 and 914 perform the same functions as elements 239, 207, 208, 209 and 241 of switch interface 202 of FIG. 2. Controller 901 performs the same functions as collision detector 238 with the exception that it is responsive to a collision detect signal from MAU 906 to transmit a signal to jam generator 903. Switch interface 902 interacts with cross-point switch 201 in the identical manner as switch interface 202 of FIG. 2 interacted with cross-point switch 201.

Of course, various changes and modifications to illustrated embodiment described above will be apparent to those skilled in the art. These changes and modifications can be made without departing from the spirit and scope of the invention and without diminishing its intended advantages. It is therefore intended that such changes and modifications be covered by the following claims.

What is claimed is:

1. An apparatus for interconnecting a plurality of packet networks for transmission of packets between ones of the plurality of packet networks, comprising:

a switching unit connected to each of the plurality of packet networks via an individual interface to each of the networks;

a decoder in an interface unit responsive to a packet from a connected one of the plurality of packet networks for determining if the packet is destined for another one of the plurality of packet networks;

a controller in the interface unit responsive to the determination that the packet is destined for the other one of the plurality of packet networks for determining if the other one of the plurality of packet networks is idle by establishing a first unilateral path through the switching unit from the other one of the plurality of packet networks to the connected one of the plurality of packet networks; and the controller further establishing a second unilateral path through the switching unit from the connected one of the plurality of packet networks to the other one of the plurality of packet networks upon the other one of the plurality of packet networks being idle, said apparatus allowing only immediate transmission of said packets based on the other of the packet networks being idle.

2. The apparatus of claim 1 wherein the controller further removing the first and second unilateral paths in response to the end of transmission of the packet.

3. The apparatus of claim 2 wherein the decoder comprises a memory for buffering only a portion of the packet, said portion including address information; and an address circuit for decoding an address of the packet to determine destination.

4. The apparatus of claim 2 wherein the plurality of packet networks is a plurality of local area networks.

5. The apparatus of claim 4 further comprises a device for generating a collision message to the connected one of the plurality of local area networks in responsive to the other one of the plurality of local area networks being determined to be busy by the controller.

6. The apparatus of claim 5 wherein the switching unit is a non-blocking switch and the connected one of the plurality of local area networks can transmit the packet to all of the plurality of local area networks via the switching unit.

7. The apparatus of claim 3 wherein the switching unit is a space switching unit.

8. A method for communicating packets between a plurality of packet networks interconnected by a switching unit via an individual interface unit to each of the plurality of packet networks, comprising the steps of:

determining if a packet from a first one of the plurality of packet networks is destined for a second one of the plurality of packet networks;

establishing a first unilateral path through the switching unit from the second one of the plurality of packet networks to the first one of the plurality of packet networks;

determining if the second one of the plurality of packet networks is idle via the first unilateral path; and establishing a second unilateral path through the switching unit from the first one of the plurality of packet networks to the second one of the plurality of packet networks upon the second one of the plurality of packet networks being idle, wherein only immediate transmission of said packets based on the other of the packet networks being idle is allowed.

9. The method of claim 8 further comprises the step of removing the first and second unilateral paths in response to the end of transmission of the packet.

10. The method of claim 9 wherein the plurality of packet networks is a plurality of local area networks.

11. The method of claim 10 further comprises the step of generating a collision message to the first one of the plurality of local area networks in response to the second one of the plurality of local area networks being determined to be busy.

12. The method of claim 11 wherein the switching unit is a non-blocking switch and first one of the plurality of local area networks can transmit the packet to all of the plurality of local area networks via the switching unit.

13. The method of claim 11 wherein the switching unit is a space switching unit.

14. An apparatus for interconnecting a plurality of packet networks for transmission of packets between ones of the plurality of packet networks, comprising:

a switching unit connected to each of the plurality of packet networks via an individual interface to each of the networks;

a decoder in an interface unit responsive to a packet from a connected one of the plurality of packet networks for determining if the packet is destined for another one of the plurality of packet networks;

a controller in the interface unit responsive to the determination that the packet is destined for the other one of the plurality of packet networks for determining if the other one of the plurality of packet networks is idle by establishing a first unilateral path through the switching unit from the other one of the plurality of packet networks to the connected one of the plurality of packet networks; and the controller further establishing a second unilateral path through the switching unit from the connected one of the plurality of packet networks to the other one of the plurality of packet networks upon the other one of the plurality of packet networks being idle, said apparatus accepting packets for transmission only if the other of the packet networks is idle.

* * * * *